Oct. 6, 1942.                E. A. EDWARDS ET AL                2,298,112
REGULATOR
Filed July 26, 1941
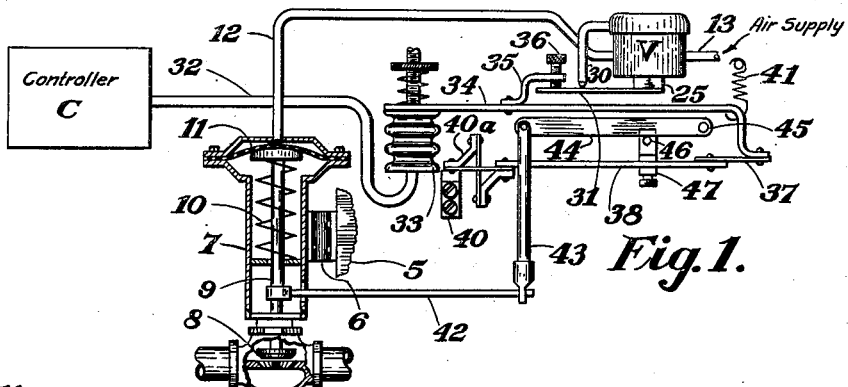
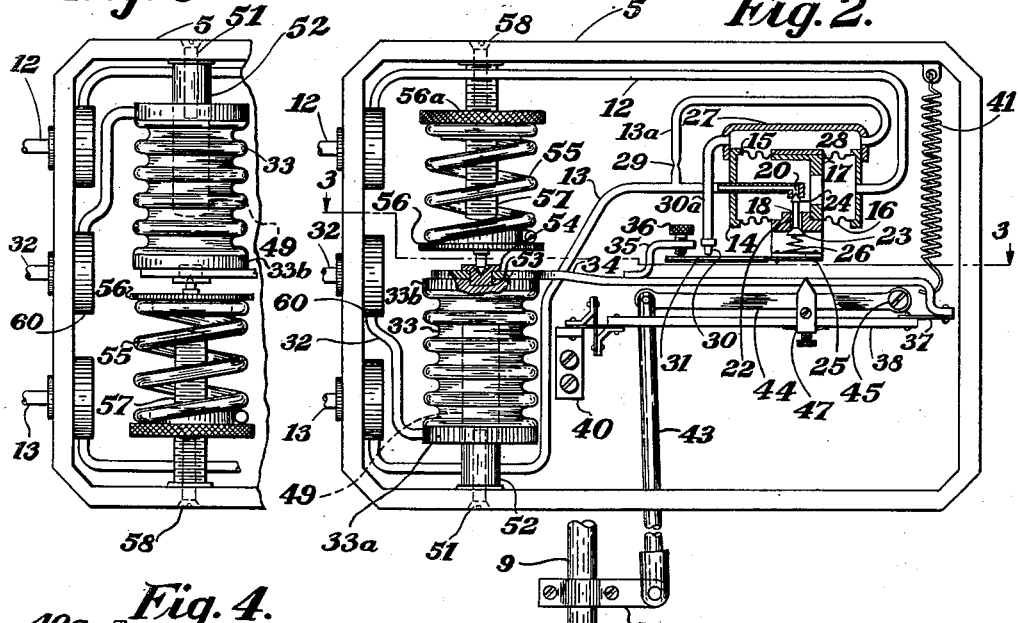
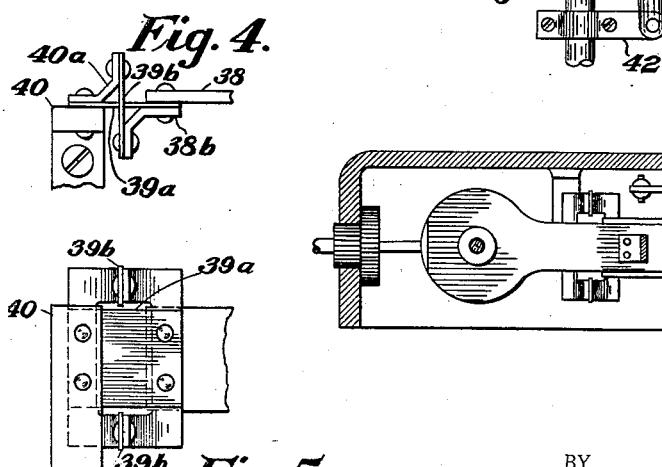
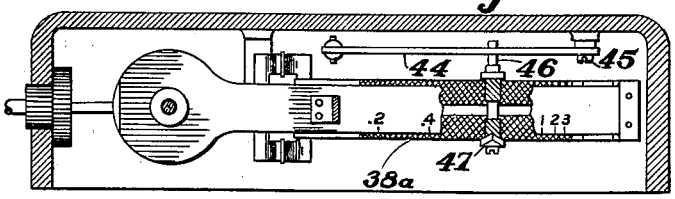
INVENTOR.
E. C. Hartman
E. A. Edwards
BY D. Clyde Jones
ATTORNEY.

Patented Oct. 6, 1942

2,298,112

UNITED STATES PATENT OFFICE 2,298,112

REGULATOR

Evan A. Edwards and Elmer C. Hartman, Rochester, N. Y., assignors to Taylor Instrument Companies, Rochester, N. Y., a corporation of New York Application July 26, 1941, Serial No. 404,220

7 Claims. (Cl. 121—41)

This invention relates to a controlling system and more particularly to a precision arrangement for correctly positioning a movable part of a valve or other controlling device used in such a system.

In the conventional type of controlling system, a controller is employed to indicate the necessary adjustment of the valve disc of a valve or other movable element of a device for governing the application of a controlling medium. However, such systems fail to afford the precise control necessary in many installations, due to the fact that the controlling valves or other devices do not move to the exact positions indicated by their related controllers. This inaccuracy of control has resulted from various causes, such as hysteresis in the operation of certain parts, or friction, notably in the stuffing box about the valve stem of the controlling valve. In order to obviate such inexactness of operation, it has been proposed to utilize precision control units of the types disclosed in the Hubbard and Claridge Patent #2,035,966 granted March 31, 1936, as well as in the Vogt Patent #2,061,118, granted November 17, 1936.

Although the devices just mentioned have functioned satisfactorily, it is the purpose of the present invention to provide a precision control arrangement which is improved in construction and which affords improved operation.

The various features and advantages of the invention will appear in the detailed description of the claims when taken with the drawing in which:

Fig. 1 is a diagrammatic showing of a controlling system having incorporated therein a precision valve positioning device of the present invention;

Fig. 2 is a front view of the device;

Fig. 3 is a horizontal sectional view thereof taken on the line 3—3 of Fig. 2;

Figs. 4 and 5 are enlarged detail views of the frictionless mounting of the actuating lever; and Fig. 6 is a fragmentary view of the device showing the parts thereof assembled in a different manner for a different type of operation.

The arrangement of the present invention includes a support in the form of a case 5 herein illustrated as mounted on the frame 6 of a motor valve assembly 7. This motor valve is of the well-known type having a valve disc 8 carried by a valve stem 9 which is normally urged toward its uppermost position, by a coil spring 10. A fluid pressure, actuated diaphragm motor 11 operates to depress the valve stem 9 against the action of the spring 10. Fluid pressure for operating the diaphragm motor 11 is supplied through the conduit 12 from the supply conduit 13, under the governing action of a control couple and a relay valve V both enclosed within the case 5.

The relay valve V includes an annular shell 14 secured to the inner surface of the rear wall of the instrument. The ends of the shell are sealed closed by the flexible diaphragms 15 and 16, the center portions of which are joined by a yoke 17 so that they move together. The lower diaphragm 16 and the lower end of the yoke have an exhaust port 18 therethru opening into the shell. A pipe 12 communicates with the interior of the shell and with diaphragm motor of the valve, while the supply pipe 13 is sealed in the side of the shell and extends into the shell where it terminates in an inlet port 20 in spaced alinement with the exhaust port 18. A spring-urged valve stem 22 movable thru the exhaust port, is provided at its lower end with a valve disc 23 and is provided at its upper end with a second valve disc 24. The valve disc 23 normally closes the exhaust port 18 and the valve disc 24 normally closes the inlet port 20 except when there is a deviation in the condition to be controlled. An inverted bridge 25 secured to the lower end of the yoke, supports the lower end of a helical spring 26 which normally urges the valve stem 22 upward. The upper end of the shell has the edge of a cap 27 sealed thereto to provide a chamber 28 between the cap and the diaphragm 15, with which chamber a branch 13a of the supply pipe 13 communicates thru the restriction 29.

The control couple comprises a nozzle 30 and a baffle 31, the nozzle communicating with chamber 28 thru the nozzle pipe 30a. The baffle 31 is rigid except for a flexible portion adjacent the point where it is fastened to the bridge 25. The flexible portion of the baffle permits it to be normally biased toward the nozzle while the mounting of the right end of the baffle on the bridge 25 causes the mentioned baffle end to partake of the motion of relay diaphragm 16 for a purpose to be described. It will be appreciated that the air pressure in the conduit 12 leading to the diaphragm motor 11, is throttled by the control couple, to position the valve disc 8 in accordance with the adjustment indicated by the controller C.

This controller C, which may be of the type disclosed in the patent to Hubbard, #1,909,469 granted May 16, 1933, can function to control temperature, pressure, liquid level, or various other conditions to be regulated and, therefore, includes condition sensitive means responsive to the variable condition to be controlled. In response to changes in this condition, the controller, through the conduit 32, applies a throttled supply of pressure fluid such as compressed air to a bellows 33 mounted within the case 5. The bellows 33 as it expands or contracts in response to this throttled supply of pressure fluid correspondingly raises or lowers the left end of the differentially operated baffle lever 34. The intermediate portion of the baffle lever 34 carries a bracket 35 which is provided with an adjustable set screw 36 located in a position to engage the free end of the baffle 31. The right-hand end of the baffle lever 34 is hinged by the leaf spring 37 to the corresponding end of the lever 38 while the left end of this lever 38 is hinged by frictionless unit including crossed leaf springs 39a and 39b to the support 40 on an inner wall of the case. A tension spring 41 fastened at its upper end to the case and at its lower end to the right-hand end of baffle lever 34, tends to swing this lever and the right-hand end of the actuating lever 38 attached thereto, in an upward direction.

The present construction, in the same manner as the constructions disclosed in the forementioned patents, insures that the controlling system will continue its operation until the valve disc 8 is precisely adjusted to a position to satisfy the condition indicated by the controller C, which condition will be satisfied when a certain space relation is established between the baffle 31 and the nozzle 30. For this purpose there is attached to the valve stem 9, an arm 42 extending at right angles to the valve stem and partaking of the movement thereof. The free end of this arm 42 is connected by the link 43, to the left end (Fig. 1) of the valve actuated lever 44. This lever is pivoted at 45 on an inner wall of the case 5 to extend in parallel but slightly offset relation with respect to the vertical plane passing through the levers 34 and 38. The valve-actuated lever is engaged by a fulcrum or pin 46 carried on a fulcrum bracket 47 which is mounted on lever 38 for adjustment lengthwise thereof. The bracket 47 is U-shaped to embrace the bottom and edges of the lever 38. The body of the pin 46 is rotatably mounted in the uprights of the bracket with the pin body engaging the upper surface of the lever 38. This surface has diagonal knurling 38a (Fig. 3) formed therein to cooperate with spiral knurling formed on the periphery of the pin body. It will be appreciated that when the pin and its body are rotated as by means of a screw driver inserted in its slotted end, they will advance to the right or left (Figs. 2 and 3) along lever 38 depending on the direction of rotation.

With this arrangement of parts, when the controller C reduces the pressure of the throttled compressed air supplied thru the conduit 32 to the bellows 33, this bellows contracts so that the left end of the baffle lever 34 is swung in a counterclockwise direction. This movement of this lever causes the set screw 36 mounted on the baffle lever bracket 35 to depress the free end of the baffle 31 and thereby increase the separation between this baffle and the nozzle 30 of the couple. When the baffle 31 recedes from the nozzle 30, the compressed air in chamber 28 will escape thru the nozzle faster than it can be supplied to this chamber thru restriction 29 and branch supply pipe 13a. As a result of this condition, the diaphragms 15 and 16 joined by the yoke 17, will tend to rise (Fig. 2). Thus, the seat at the exhaust port 18 will withdraw from the valve disc 23, thereby opening the exhaust port so that the air pressure in conduit 12 and the diaphragm motor 11 of the main valve, is reduced. At this time inlet port 20 will remain closed.

It should be mentioned that when the diaphragms 15 and 16 are moved upward as above described the bridge 25 which is fixed to the lower end of the yoke 17, rises. This movement of the bridge elevates the right hand end of baffle 31 which is attached to the bridge. Thus, the right hand end of baffle will swing a very small amount about set screw 36 as center, to reduce the mentioned separation between the baffle and the nozzle providing sensitivity reduction or "follow-up" action. This action reduces the tendency of "hunting" in the system.

As the pressure in the conduit 12 and the diaphragm motor 11 becomes less, this motor contracts and the coil spring 10 opens the valve disc 8 proportionally. When the valve disc 8 and the valve stem 9 connected thereto, are thus operated, the arm 42 attached to the valve stem 9, elevates the link 43. This movement of the link tends to swing the lever 44, in a clockwise direction thereby permitting the pin 46 and also the lever 38 to rise. The spring 41 is thereby enabled to swing the levers 38 and 34 in a counterclockwise direction. As the baffle lever 34 thus moves counterclockwise, the set screw 36 on its bracket 35 tends to move upward so that the baffle 31 approaches the nozzle 30, until a certain separation exists therebetween. A condition change in the opposite direction at controller C causes a similar operation of the mechanism but in the opposite sense. It should be mentioned that when the baffle and nozzle are in controlling position, that is, valve motor pressure sustained at a definite value, the space therebetween may be of the order of seven thousandths of an inch (.007″) plus or minus. Changes in the baffle-nozzle space relation, necessary to cause the motor valve to move to the new controlling positions, will be almost imperceptible to the naked eye, since a baffle-nozzle space change necessary to cause the motor valve to travel from its fully closed to its fully open position, is only of the order of two thousandths of an inch (.002″).

In accordance with the present invention, the precision unit enclosed in the case 5 utilizes a bellows 33 instead of a tricapsular chamber, such as illustrated at 22 in the mentioned Vogt Patent #2,061,118. It has been found that the characteristics of a tricapsular chamber are such that it fails to have a linear relation between the air pressure introduced therein and the expansion resulting therefrom. The bellows 33 on the other hand, possesses this highly desirable characteristic. However, the movable end of this bellows, because of the greater bellows length, must be properly guided to insure that the bellows will expand and contract in a path substantially along its principal axis instead of wobbling with respect to this axis. It will be understood that this path, although slightly arcuate, does not deviate materially from the straight axis of the bellows. This guidance is effected by the following construction and arrangement of parts. The bellows 33 includes a rigid metal disc 33a which is perforated to receive a rod 49 serving to limit the contraction of the bellows. The lower portion of this rod is sealed to the disc 33a while the lower end of this rod is tapped to receive a securing screw 51. This screw passes thru a countersunk hole in the bottom of the case and through a pillar 52 so that the bellows disc 33a is anchored to the bottom of the case with the pillar interposed therebetween. The upper end of the bellows is sealed by a rigid disc 33b having a cavity 53 therein. This cavity receives the stem of a flanged anchoring cap 54, which portion passes through an aperture in the left end of the lever 34. This lever, as will be pointed out, guides the movement of the bellows 33. The bellows operates against a compression spring 55 of approximately the diameter of the bellows. The lower end of this spring acts against the upper surface of a circular plate 56, the lower surface of which is provided with a centrally located pin, sharpened to act as a fulcrum engaging in the recess in the anchoring cap. The upper end of the spring 55 engages a circular nut 56a having a knurled edge whereby the nut can be adjusted to change the compression of the spring 55. This nut is in threaded engagement with a threaded stop rod 57, the lower end of which projects into the path of the circular plate 56 to limit the expansion of the bellows. The upper end (Fig. 2) of the stop rod is tapped to receive a screw 58 passing through a countersunk hole in the top of the case. The stop rods 49 and 57 are in alignment so that by removing the screws 51 and 58, the bellows as well as the spring assembly can be reversed as shown in Fig. 6, in which case the unit will operate with an inverse acting valve to open its valve disc on the application of compressed air to its diaphragm motor. It will be noted that compressed air conduit 32 communicates with the interior of the bellows through the disc 33a and also communicates with the outlet support 60 which is rotatably mounted at a point equidistant from the top and bottom of the case.

It has been mentioned that the upper or free end of the bellows 33 must be guided in order to prevent it from deviating materially from movement along its principal axis. To this end the levers 34 and 38 cooperate. The left end of the lever 34 is joined to the movable end of the bellows in the manner just described, whereas the right end of this lever is connected by the leaf spring 37 to the right hand end of the lever 38. The left end of the lever 38 is supported by crossed, leaf springs having their ends respectively joined to the lever 38 and to fixed support 40 mounted on the inner wall of the case. As best shown in Figs. 4 and 5, the leaf spring 39a is connected to the lever 38 and to the support 40 to extend in the same direction as the lever 38, whereas the pair of leaf springs 39b and 39b are respectively connected to a bracket 38b on the lever 38 and to a bracket 40a mounted on the support 40. It will be noted that the leaf springs 39b pass at either side of the leaf spring 39a and extend in a direction at right angles thereto. This mounting constitutes a frictionless pivot which insures that the levers 38 and 34 will move in a vertical plane common to the principal axis of the bellows 33.

The unit shown in Fig. 2 is for operation with a direct-acting type of valve. When, however, the unit is to be used with an indirect-acting valve, the parts will be arranged as shown in Fig. 6. In order to reassemble the unit to the form shown in this figure, screws 51 and 58 are removed. This permits the stop rod 57, the spring 55 and the plate 56 to be removed. The anchoring cap 54 is withdrawn from the left hand of the lever 34 and from the cavity 53 in the disc 33b. The bellows 33 together with the air conduit 32 is rotated about the outlet support 60 until the bellows occupies the position formerly occupied by the spring assembly. The lever 34 is now secured to the disc 33b at the lower end of the bellows, the anchoring cap 54 passing through the aperture in the lever 34 into the cavity 53 in the disc. The screw 51 is then inserted through the aperture in the upper wall of the case and the pillar, being screwed into the tapped end of the stop rod 49. The parts of the spring assembly are then arranged as shown in Fig. 6, the screw 58 passing through the opening in the lower wall of the case and into the end of the stop rod 57.

The present unit is adapted to function with valves having different valve stem travel. Thus the lever 38 must move a fixed amount for any given fraction of the valve stem travel irrespective of the length of the complete path of valve stem travel. To this end the fulcrum bracket 47 and pin 46 are provided. It will be appreciated that when the valve stem has a relatively long path of travel, the bracket 47 and pin 46 will be adjusted in a position nearer the right hand portion of the lever 38, whereas when the complete path of travel of the valve stem is relatively short, the bracket 47 and pin 46 will be adjusted nearer to the left-hand end of the lever 38.

What we claim is:

1. In an element positioning arrangement, an element, means including a control couple comprising a baffle and a nozzle for positioning said element in response to changes in the space relation between said baffle and nozzle, a source of pressure fluid flowing through said nozzle under the control of said baffle, an expansible chamber responsive to the pressure of the fluid in said nozzle, means for moving one end of said baffle proportionally to the response of said chamber, a baffle lever provided with means at an intermediate portion thereof engaging the other end of said baffle, means for positioning one end of said baffle lever, and means responsive to the positioning of said element for adjusting the other end of said baffle lever.

2. In an element positioning arrangement, an element, means including a control couple comprising a baffle and a nozzle for positioning said element in response to changes in the space relation between said baffle and nozzle, a source of pressure fluid flowing through said nozzle under the control of said baffle, an expansible chamber responsive to the pressure of the fluid in said nozzle, one end of the baffle being mounted on said chamber, a baffle lever provided with means at an intermediate portion thereof engaging the other end of said baffle, means for positioning one end of said baffle lever, and means responsive to the positioning of said element for adjusting the other end of said baffle lever.

3. In an element positioning system, a fluid-actuated element, a source of pressure fluid, means including a throttling relay for controllably applying a pressure fluid from said source for operating said element, said relay including a flexible-walled chamber, a nozzle communicating with said source and also communicating with said chamber, a baffle normally spaced a controlling distance from said nozzle and cooperating therewith to vary the escape of fluid therethrough, means for changing the space relation between said baffle and said nozzle, means including said relay for reducing said last-mentioned change in the space relation, and means mechanically interconnecting said element and said baffle for reducing said change in the space relation until a given space relation is established.

4. In an element positioning arrangement, an element, means including a control couple comprising a baffle and a nozzle having a throttling space relation therebetween, said couple serving to position said element in response to changes in the space relation between said baffle and nozzle, a source of pressure fluid flowing through a restriction and thence through said nozzle under the control of said baffle, an expansible chamber responsive to the pressure of the fluid in said nozzle, one end of the baffle being mounted on said chamber for movement thereby, a baffle lever provided with means at an intermediate portion thereof engaging the other end of said baffle, means for positioning one end of said baffle lever, and means responsive to the positioning of said element for adjusting the other end of said baffle lever whereby a given space relation between said baffle and said nozzle is established when said element is accurately positioned.

5. In an element positioning arrangement, a support, a regulating element, means including a control couple comprising a baffle and a nozzle for positioning said element in response to changes in the space relation between said baffle and nozzle, a baffle lever operable to vary the space relation between the baffle and the nozzle, a bellows having one of its ends fixed to said support and having its other end fastened to one end of said baffle lever, whereby said baffle lever guides said bellows, a spring acting against the movable end of said bellows, the mentioned end of the baffle lever being located between said spring and said bellows, means for expanding and contracting said bellows, a second lever having one end hinged to said support and having its other end hinged to the second end of said baffle lever, a third lever having one end pivoted on said support adjacent the hinged connection between said baffle lever and said second lever, all of said levers extending in the same general direction, means for moving the other end of said third lever in accordance with the movement of said element, means for moving said second lever as a function of the movement of said third lever whereby the bellows moves one end of said baffle lever and the control element effects the movement of the other end of said baffle lever.

6. In an element positioning arrangement, a support, a regulating element, means including a control couple comprising a baffle and a nozzle for positioning said element in response to changes in the space relation between said baffle and nozzle, a baffle lever operable to vary the space relation between the baffle and the nozzle, a bellows having one of its ends fixed to said support and having its other end fastened to one end of said baffle lever whereby said baffle lever guides said bellows, a spring acting against the movable end of said bellows, the mentioned end of the baffle lever being located between said spring and said bellows, means for expanding and contracting said bellows, a second lever having one end hinged to said support by a leaf spring and having its other end hinged to the second end of said baffle lever by a second leaf spring, a third lever having one end pivoted on said support adjacent the hinged connection between said baffle lever and said second lever, all of said levers extending in the same general direction, means for moving the other end of said third lever in accordance with the movement of said element, means for moving said second lever as a function of the movement of said third lever whereby the bellows moves one end of said baffle lever and the element effects the movement of the other end of said baffle lever.

7. In an element positioning arrangement, a support including opposed pieces joined by a connecting piece, an element, means including a control couple comprising a baffle and a nozzle for positioning said element in response to changes in the space relation between said baffle and nozzle, a baffle lever operable to vary the space relation between the baffle and the nozzle, a bellows having one of its ends detachably mounted on one of the pieces of said support and having its other end fastened to one end of said baffle lever whereby said baffle lever guides said bellows, a spring having one end engaging the other of said supporting pieces and acting against the movable end of said bellows, the mentioned end of the baffle lever being located between said spring and said bellows, a conduit support rotatably mounted on an intermediate portion of said connecting piece, a conduit connecting said conduit support with the mounted end of said bellows whereby the positions of the bellows and said spring can be conveniently reversed at will, means for throttling compressed air supplied to said conduit to expand and to contract said bellows, a second lever cooperating with said baffle lever, a leaf spring hingedly connecting one end of said second lever to said support, another leaf spring hingedly connecting the other end of said second lever to the second end of said baffle lever, a third lever having one end pivoted on said support adjacent the hinged connection between said baffle lever and said second lever, all of said levers extending in the same general direction, means for moving the other end of said third lever in accordance with the movement of said element, means for moving said second lever as a function of the movement of said third lever whereby the bellows moves one end of said baffle lever and the control element effects the movement of the other end of said baffle lever.

EVAN A. EDWARDS.
ELMER C. HARTMAN.